(12) United States Patent
Fertner et al.

(10) Patent No.: US 8,428,224 B2
(45) Date of Patent: Apr. 23, 2013

(54) METHOD FOR TRANSMISSION LINE ANALYSIS

(75) Inventors: Antoni Fertner, Stockholm (SE); Per Ola Börjesson, Lund (SE); Klas Ericson, Alvsjö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 199 days.

(21) Appl. No.: 12/988,314

(22) PCT Filed: Apr. 23, 2008

(86) PCT No.: PCT/SE2008/050465
§ 371 (c)(1),
(2), (4) Date: Dec. 22, 2010

(87) PCT Pub. No.: WO2009/131501
PCT Pub. Date: Oct. 29, 2009

(65) Prior Publication Data
US 2011/0091019 A1    Apr. 21, 2011

(51) Int. Cl.
H04M 1/24    (2006.01)
H04M 3/08    (2006.01)
H04M 3/22    (2006.01)

(52) U.S. Cl.
USPC ............................. 379/30; 379/24; 324/600

(58) Field of Classification Search ........... 379/1.01, 379/1.04, 23, 24, 27.01, 30, 32.04, 394, 398, 379/399.01, 414; 702/57, 62; 324/600, 612, 324/615, 619, 658, 691
See application file for complete search history.

(56) References Cited

U.S. PATENT DOCUMENTS

| | | | |
|---|---|---|---|
| 4,313,169 A | | 1/1982 | Takagi et al. |
| 2002/0172329 A1* | | 11/2002 | Rashid-Farrokhi et al. ............ 379/22.02 |
| 2005/0213684 A1* | | 9/2005 | Flake et al. .................... 375/295 |
| 2007/0140474 A1* | | 6/2007 | Fertner et al. ................. 379/398 |
| 2008/0317166 A1* | | 12/2008 | Flake et al. .................... 375/296 |
| 2009/0213998 A1* | | 8/2009 | Allevad et al. ............ 379/22.03 |
| 2011/0035170 A1* | | 2/2011 | Flake et al. ..................... 702/79 |

FOREIGN PATENT DOCUMENTS

| | | |
|---|---|---|
| FR | 2586818 A1 | 3/1987 |
| GB | 276419 A | 8/1927 |
| GB | 495815 A | 11/1938 |
| JP | 7012878 A | 1/1995 |
| JP | 11237426 A | 8/1999 |
| WO | 2007050001 A1 | 5/2007 |

OTHER PUBLICATIONS

PCT International Search Report, mailed Dec. 29, 2008, in connection with International Application No. PCT/SE2008/050465.
PCT Preliminary Report on Patentability, completed Mar. 25, 2010, in connection with International Application No. PCT/SE2008/050465.

* cited by examiner

*Primary Examiner* — Binh Tieu
(74) *Attorney, Agent, or Firm* — Potomac Patent Group PLLC

(57) ABSTRACT

The present invention concerns methods for estimating one or more transmission properties of a telecommunications transmission line. Estimates of the line input impedance, $Z_{in}$ at a frequency $f$, and the line capacitance $\hat{C}$ are made. An estimate is then made in dependence of $\hat{C}$, the frequency $f$ and a value $\Gamma$, where $\Gamma$ satisfies the relationship $\Gamma \coth(\Gamma) = Z_{in} \cdot j\omega\hat{C}$, and $\omega = 2\pi f$. Accuracy may be improved by least squares fitting a curve to a set of intermediate values and then generating an estimate from the coefficients of the curve.

15 Claims, 12 Drawing Sheets

METHOD FOR TRANSMISSION LINE ANALYSIS

TECHNICAL FIELD OF THE INVENTION

The present invention relates to the field of transmission line analysis.

BACKGROUND

It is of great interest for the operation of telecommunication networks to measure the properties of the transmission lines of the network. The results of such measurements can be used for e.g. detecting faults, locating faults, predicting certain faults which are about to occur, and estimating the suitability and capacity of a line for certain services, such as DSL.

A variety of methods and devices can be used to estimate line properties.

In patent application WO2005SE01619 (publication no WO2007050001) and the patent applications it refers to, a method is described wherein a signal containing certain frequencies may be sent through a line board, a resulting signal received and transmission properties estimated from the relationship between the signals.

The accuracy of estimates of line properties are often not sufficient for all purposes. Hence there is always a desire for more accurate, yet reasonably computationally efficient methods to make estimates of line properties.

SUMMARY

The present invention provides a new method to estimate one or more transmission properties of a telecommunications transmission line.

According to the method, estimates of the transmission line capacitance $\hat{C}$, and the complex impedance $Z_{in}$ of the transmission line at a frequency f are made. One or more transmission line properties are then estimated in dependence of $\hat{C}$, f, and a value $\Gamma$ that satisfies $\Gamma \coth(\Gamma) = Z_{in} \cdot j\omega\hat{C}$ where $\omega = 2\pi f$.

This has the advantage that better accuracy can be achieved than previously, and it is also possible to make the estimate with good computational efficiency.

Such an estimate may be generated in different ways. In particular, different formulas may be used for estimating different line properties.

Moreover, even though the estimate is made in dependence of $\Gamma$, it is not necessary to generate $\Gamma$ explicitly. A related value may be generated and used, or the end result may be generated directly, without actually generating $\Gamma$ as intermediate result.

For example, $\Gamma$, $\Gamma^2$ or one of them multiplied by a predetermined value, such as $$\frac{\Gamma^2}{\omega \cdot \hat{C}},$$

or the real or imaginary part of any of those may be generated as an intermediate value.

According to one aspect of the invention, $\Gamma$ may be generated by numerical solution of the equation $\Gamma \coth(\Gamma) = Z_{in} \cdot j\omega\hat{C}$. According to another aspect, $\Gamma^2$ may be generated by solving a biquadratic equation that can be deduced by replacing $\Gamma \coth(\Gamma)$ in the expression $\Gamma \coth(\Gamma) = Z_{in} \cdot j\omega\hat{C}$ with a truncated Taylor series expansion of $\Gamma \coth(\Gamma)$ in the variable $\Gamma$. This is a computationally efficient way of determining $\Gamma^2$.

Other truncated series expansions or ratios of series expansions which correspond to $\Gamma \coth(\Gamma)$ may also be used.

As an option, accuracy of an estimate may be further increased by making several estimates of $Z_{in}$ at different frequencies f, generating a set of intermediate values that correspond to the estimates of $Z_{in}$, least squares fitting a curve to the set of intermediate values and estimating a property of the transmission line in dependence of the coefficients of the fitted curve.

An object of the invention is thus to provide a method for estimating at least one transmission property of a telecommunications transmission line.

An advantage of the method is that improved accuracy can be achieved. A further advantage is that computationally efficient implementations are possible.

Yet an advantage is that the estimates of $\hat{C}$ and $Z_{in}$ may be made in many different ways, for example by measurement through a line interface board.

Another advantage is that the method may be used to improve on the method of WO2005SE01619.

DETAILED DESCRIPTION

Figure 14:
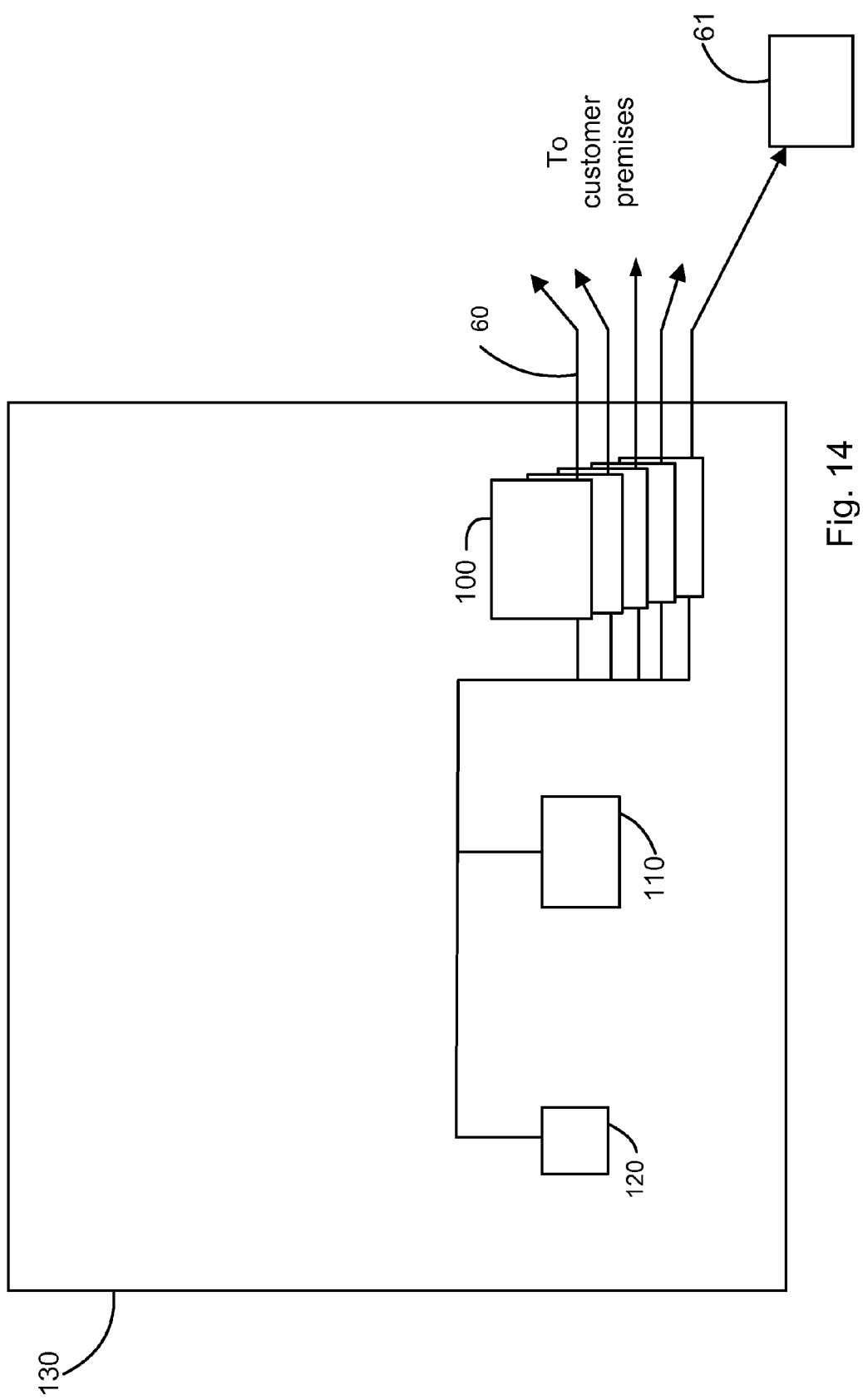
FIG. 14 shows a block diagram of an example setup for practicing the method of the invention.

With reference to FIG. 14, telecommunication transmission lines 60 typically terminate in one end at a customer premises site 61 and in the other end at a central office setting 130. Here, the lines are typically connected to line boards 100. The line boards 100 are typically controlled by a processor 110 of a telecommunication exchange. It is of great interest to be able to measure properties of the lines 60 from the central office setting 130.

A transmission line can be described by per-unit-length parameters: a series resistance R, a series inductance L, a shunt conductance G, and a shunt capacitance C (e.g in the denominations Ω/km, H/km, S/km and F/km respectively). These are called primary parameters of the cable type.

In practice, the shunt conductance of the transmission line can be neglected (G=0).

The complex-valued propagation constant γ and characteristic impedance $Z_0$ are defined in terms of the primary parameters: R, L, G and C, i.e. $\gamma = \sqrt{(R+j\omega L)\cdot(G+j\omega C)}$ and $Z_0 = \sqrt{(R+j\omega L)/(G+j\omega C)}$ respectively, where $\omega = 2\pi f$, f is the frequency and j is the imaginary unit. For an open-ended transmission line of length d, the complex input impedance can be expressed as $$Z_{in}=Z_0 coth(\gamma d)$$

The values $\hat{R}$, $\hat{L}$, $\hat{G}$ and $\hat{C}$, where $\hat{R}=R \cdot d$, $\hat{L}=L \cdot d$, $\hat{G}=G \cdot d$, $\hat{C}=C \cdot d$, are called line constants. Likewise, we introduce $\Gamma = \gamma \cdot d$.

A method for estimating the line constants is described in patent application WO2005SE01619. There is a need to improve on the accuracy of the estimates generated with the methods described in that patent application to make them more useful, in particular the inductance estimate.

While the method of WO2005SE01619 uses series expansion in terms of line constants and angular frequency, the present invention uses in one aspect a series expansion in terms of $\Gamma^2$, and in another aspect a numerical solution for $\Gamma$. Contrary to WO2005SE01619 we can get one independent solution $\Gamma^2=\Gamma(\omega_k)^2$ for each angular frequency $\omega_k$, instead of estimates of line constants for all frequencies. This reduces numerical problems related to that solution.

As a consequence, the present invention improves on the accuracy that is attained by the method of WO2005SE01619, but it can also be used together with other methods.

The accuracy improvement of the present invention is achieved as described below:

Neglecting shunt conductance G, (G=0), the propagation constant $\gamma$ can be expressed in terms of the characteristic impedance $Z_0$ as follows $$\gamma d = Z_0 \cdot j\omega \cdot \hat{C}$$

Since input impedance can be expressed as $Z_{in}=Z_0 coth(\gamma d)$ one obtains $$Z_{in} \cdot j\omega \cdot \hat{C} = Z_0 \cdot j\omega \cdot \hat{C} \cdot coth(Z_0 \cdot j\omega \cdot \hat{C}) = \Gamma \cdot coth(\Gamma) \quad (1)$$

where $\Gamma = Z_0 \cdot j\omega \cdot \hat{C}$.

If $\hat{C}$, f, and $Z_{in}$ at the frequency f are known, then $\Gamma$ may be determined by solving eq. (1)

In general, a solution for $\Gamma$ may be found by solving numerically equations of the type $$coth(\Gamma) = \frac{\Gamma_{in}}{\Gamma} \text{ or } tanh(\Gamma) = \frac{\Gamma}{\Gamma_{in}}$$

where $$\Gamma_{in} = Z_{in} \cdot j\omega \cdot \hat{C}$$

A numerical solution can be found using vastly differing techniques like e.g. the Newton-Raphson method or the van Wijngaarden-Dekker-Brent method. Those methods work best if the initial value is close enough to the true value of the solution. When solving for several different frequencies, a good guess can be using the solution from the previous frequency point as a start value for the next frequency point.

The following simple iterative methods may also be used for a numerical solution.

$$\Gamma_{i+1} = arc \, tanh\left(\frac{\Gamma_i}{\Gamma_{in}}\right) \quad (a)$$

$$\Gamma_{i+1} = arc \, coth\left(\frac{\Gamma_{in}}{\Gamma_i}\right) \quad (b)$$

$$\Gamma_{i+1} = \frac{1}{2} log\left(\frac{\Gamma_{in}+\Gamma_i}{\Gamma_{in}-\Gamma_i}\right) \quad (c)$$

where $$\Gamma_{in} = Z_{in} \cdot j\omega \cdot \hat{C}$$

The numerical solutions seem to work best for small values of $\Gamma$, such as is usually the case for frequencies in the POTS band. The simplest and most reliable numerical method appears to be the classic Newton-Raphson method.

However, we can create a polynomial to approximate eq. (1), which is entirely sufficient to solve the problem. Taylor series expansion of $\Gamma \, coth(\Gamma)$ in the variable $\Gamma$, and limited to the first three terms gives the following polynomial equation for each frequency point.

$$Z_{in} \cdot j\omega \cdot \hat{C} = 1 + \frac{\Gamma^2}{3} - \frac{\Gamma^4}{45} \quad \text{eq. (2)}$$

The series expansion is valid when the absolute value of line propagation constant times the line length is less than $\pi$, that is, $|\gamma d| < \pi$ or $|\Gamma| < \pi$. For a given frequency, this limits the length of the transmission line for which a property is to be estimated. Alternatively, for a given line length, the frequency is limited.

Figure 15:
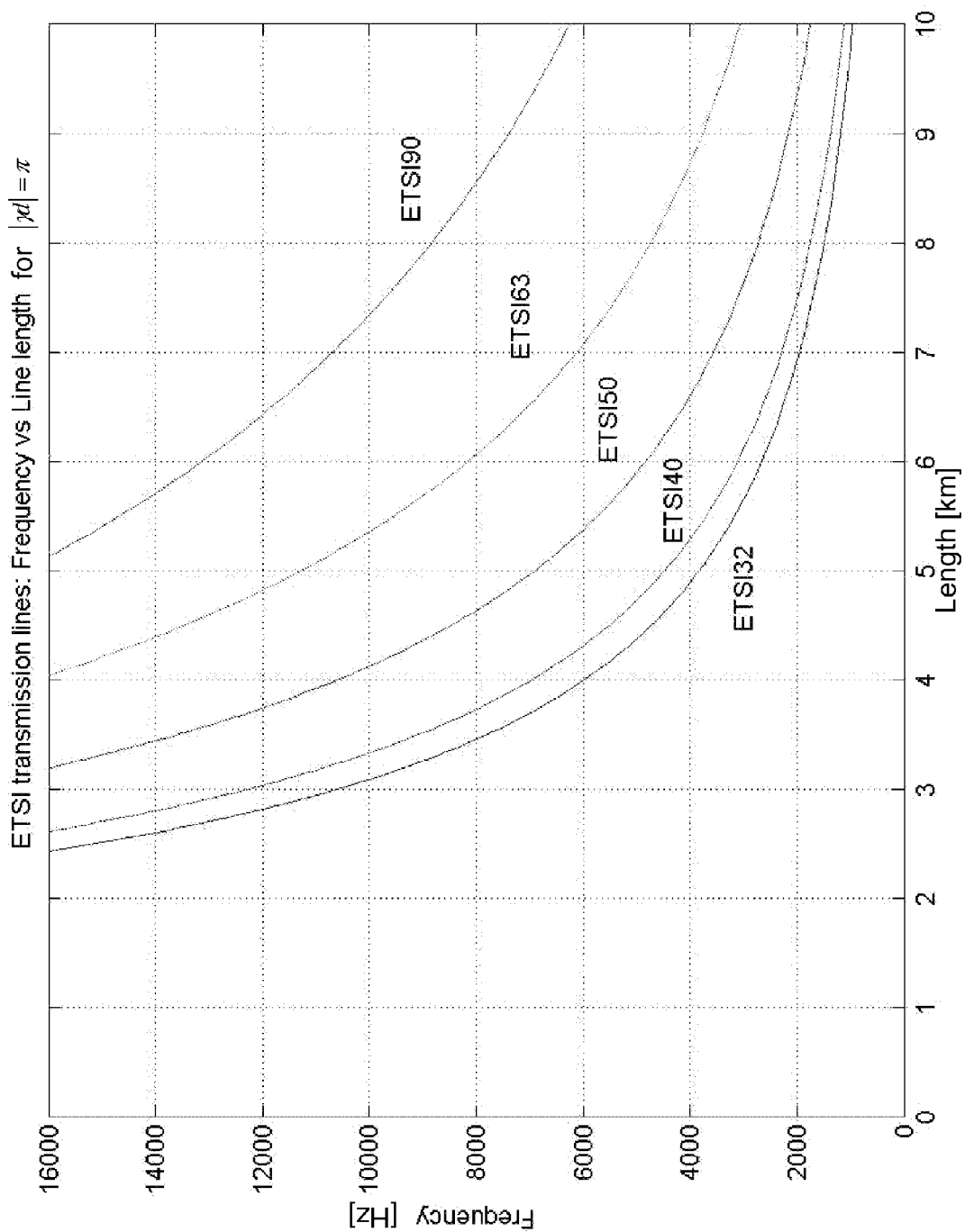
FIG. 15 shows a diagram of frequency as a function of cable length for the condition that the absolute value of the propagation constant times line length equals $\pi$, for various ETSI cable types.

FIG. 15 shows a diagram of frequency as a function of cable length for the condition that the absolute value of the propagation constant times line length equals $\pi$, for various ETSI cable types.

The biquadratic equation according to eq. (2) is easy to solve and provides sufficient accuracy. However, it is also possible to use more terms of the series expansion, i.e. a higher order polynomial. General methods for finding roots (zero-crossings) of such polynomials are described in the technical literature.

Yet another equivalent series expansion may be derived from eq. (1) after expressing it as $(Z_{in} \cdot j\omega \cdot \hat{C}) \cdot sinh(\Gamma) = \Gamma \cdot cosh(\Gamma)$.

Replacing $sinh(\Gamma)$ and $cosh(\Gamma)$ with their series expansions and truncating after the three first terms, one may obtain after elementary manipulations $$\frac{\Gamma^4}{120} \cdot (5 - \Gamma_{in}) + \frac{\Gamma^2}{6} \cdot (3 - \Gamma_{in}) + (1 - \Gamma_{in}) = 0 \quad \text{eq. (2a)}$$

In general, coefficients of a biquadratic or higher order equation may also be obtained by other means, e.g. using elementary least squares techniques. Instead of using series expansion for cotangent hyperbolic, sinus hyperbolic and cosines hyperbolic, one can consider the function $\Gamma \cdot coth(\Gamma)$ as a polynomial ratio $$G(\Gamma) = \Gamma \cdot coth(\Gamma) = \frac{b_0 + b_1 \Gamma^2 + b_2 \Gamma^4 + \ldots}{1 + a_1 \Gamma^2 + a_2 \Gamma^4 + \ldots} \quad \text{eq. (2b)}$$

The optimal values of coefficients $b_0$ $b_1$ $b_2$ ... and $a_1$ $a_2$ ... can be found by minimizing least square deviation from the function $\Gamma \cdot coth(\Gamma)$, $$V_2(a, b) = \sum_{k=K_1}^{K_2} \left( \Gamma_k \cdot \coth(\Gamma_k) - \frac{b_0 + b_1 \Gamma_k^2 + b_2 \Gamma_k^4 + \ldots}{1 + a_1 \Gamma_k^2 + a_2 \Gamma_k^4 + \ldots} \right)^2 \quad \text{eq. (2c)}$$

One possible simplification may be the assumption that $a_1 a_2 \ldots$ are the coefficients of series expansion of the sinus hyperbolic; we can then find the coefficients $b_0 b_1 b_2 \ldots$ which minimize the least squares criterion $$V_2(a, b(a)) = \sum_{k=K_1}^{K_2} \left( \Gamma_k \cdot \coth(\Gamma_k) - \frac{b_0 + b_1 \Gamma_k^2 + b_2 \Gamma_k^4 + \ldots}{1 + a_1 \Gamma_k^2 + a_2 \Gamma_k^4 + \ldots} \right)^2 \quad \text{eq. (2d)}$$

Limiting our example to just a biquadratic equation, the problem is reduced to determining $b_0\ b_1\ b_2$ while $$a_1 = \frac{1}{6} \text{ and } a_2 = \frac{1}{120}.$$

A set of values of $\Gamma$ $[\Gamma_{K_1} \ldots \Gamma_{K_2}]$ covering an interval of interest is chosen, for example real values from 0 to 1 in steps of 0, 02.

For an improved match to $\Gamma \cdot \coth(\Gamma)$, interval $[K_1 \ldots K_2]$ can be subdivided into several $\Gamma$ intervals, where the estimation of $b_0\ b_1\ b_2$ will be performed. In practice, these intervals may correspond to values of $\Gamma$ for e.g. low, medium and high frequencies.

Equations 2a-d and eq. 2 are some examples of how a biquadratic equation can be obtained.

A solution of eq. (2) will now be illustrated.

Eq. (2) has the form of a quadratic function of a square, as is shown by rewriting it $$-\frac{1}{45}(\Gamma^2)^2 + \frac{1}{3}(\Gamma^2) + \left(1 - Z_{in} \cdot j\omega \cdot \hat{C}\right) = 0 \quad \text{eq. (3)}$$

Therefore the solutions of eq. (3) can be found using the classic quadratic formula:

$$\Gamma^2 = \frac{-\frac{1}{3} \pm \sqrt{\left(\frac{1}{3}\right)^2 - 4 \cdot \left(-\frac{1}{45}\right) \cdot \left(1 - Z_{in} \cdot j\omega \cdot \hat{C}\right)}}{2 \cdot \left(-\frac{1}{45}\right)} \quad \text{eq. (4)}$$

This provides a solution with particularly good computational efficiency.

Observe also that $$\Gamma^2 = (\gamma d)^2 = -\omega^2 \cdot \hat{L} \cdot \hat{C} + j\omega \cdot \hat{R} \cdot \hat{C} \quad \text{eq. (5)}$$

This means that the accepted solution should have negative real part and positive imaginary part. The other solution is rejected.

From eq. (5), it can be deduced that an inductance estimate can be generated as $$\hat{L} = -\text{Re}(\Gamma^2)/\omega^2 \hat{C} \quad \text{eq. (6)}$$

And that a resistance estimate can be generated as $$\hat{R} = \text{Im}(\Gamma^2)/\omega \hat{C} \quad \text{eq. (7)}$$

In eq. (1), $\Gamma$ was defined as $\Gamma = Z_0 \cdot j\omega \cdot \hat{C}$.

Hence, an estimate of the characteristic impedance may be generated as $$Z_0 = \frac{\Gamma}{j\omega \cdot \hat{C}}. \quad \text{eq. (8)}$$

$\Gamma$ may be generated from $\Gamma^2$ by taking the square root of $\Gamma^2$ and selecting the root which has a positive real part and a positive imaginary part.

As shown above, then, when an estimate of $Z_{in}$ at the frequency f, and an estimate of $\hat{C}$ have been made, an estimate of a transmission property of the line may be generated in dependence of $\hat{C}$, f and $\Gamma$.

The methods disclosed may be combined in different ways to generate such an estimate.

Figure 1:
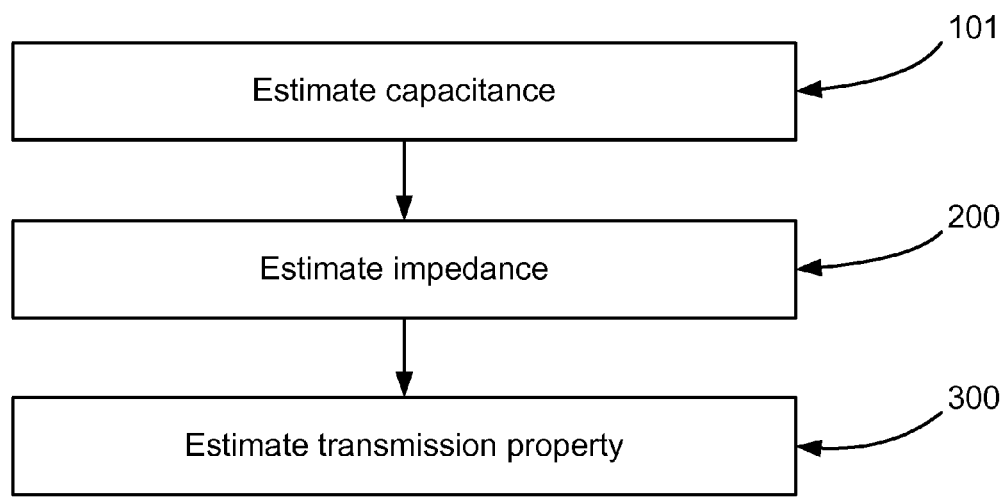
FIG. 1 shows a flowchart of a method according to the invention.
Figure 2:
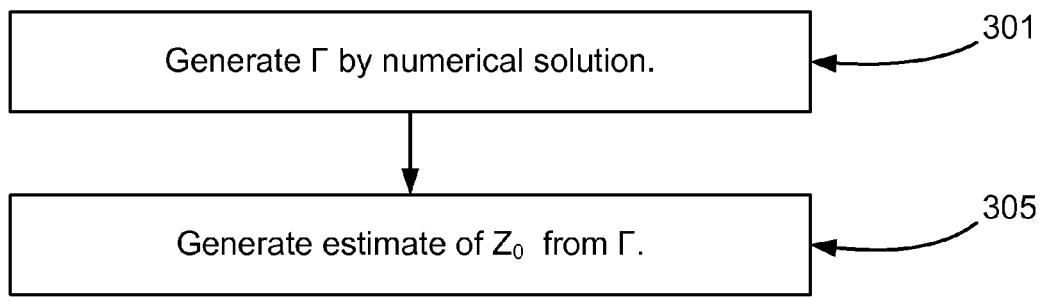
FIGS. 2-12 show flowcharts of examples of how the last step of the flowchart of FIG. 1 may be carried out.

For example, $\Gamma$ may first be generated numerically. $\Gamma$ is then squared to obtain $\Gamma^2$, and inductance and resistance estimates are generated by applying eqs. (6) and (7), (FIGS. 4 and 6) whereas an estimate of the characteristic impedance is made by applying eq. (8) to $\Gamma$ (FIG. 2).

Figure 3:
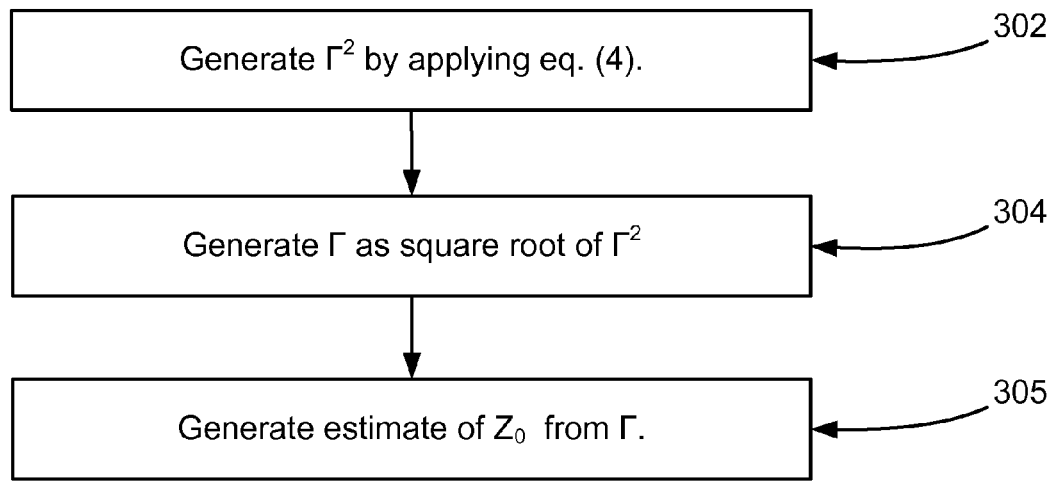

Alternatively, $\Gamma^2$ is generated by applying eq. (4). Eqs. (6) and (7) are then applied to generate inductance and resistance estimates (FIGS. 5 and 7), whereas for the estimate of the characteristic impedance, $\Gamma$ is generated as the square root of $\Gamma^2$ having positive real and imaginary parts and eq. (8) is then applied (FIG. 3).

It is of course also possible to combine multiple equations into one when generating an estimate, as well as doing operations in many different, yet mathematically equivalent forms.

For example, one may note that the biquadratic equation (3) has a solution (eq. (5)) for which the real and imaginary parts have a common factor $\omega \cdot \hat{C}$ $$\Gamma^2 = -\omega^2 \cdot \hat{L} \cdot \hat{C} + j\omega \cdot \hat{R} \cdot \hat{C} = \omega \cdot \hat{C} \cdot (-\omega \cdot \hat{L} + j \cdot \hat{R})$$

The common factor $\omega \cdot \hat{C}$ may be included earlier in calculations by making a substitution $$Y = \frac{\Gamma^2}{\omega \cdot \hat{C}} \quad \text{eq. (9a)}$$

Equation (3) will be transformed into an ordinary quadratic equation $$Y^2 - \frac{15}{\omega \cdot \hat{C}} \cdot Y + 45 \cdot \frac{(Z_{in} \cdot j\omega \cdot \hat{C} - 1)}{(\omega \cdot \hat{C})^2} = 0$$

If we denote by $$p = -\frac{15}{\omega \cdot \hat{C}} \quad \text{eq. (9)}$$

and $$q = 45 \cdot \frac{(Z_{in} \cdot j\omega \cdot \hat{C} - 1)}{(\omega \cdot \hat{C})^2} \quad \text{eq. (10)}$$

the solution is found by $$Y_{1,2} = -\frac{p}{2} \pm \sqrt{\left(\frac{p}{2}\right)^2 - q} \qquad \text{eq. (11)}$$

Again we choose the solution with negative real part and positive imaginary part.

A resistance estimate is then generated as $$\hat{R} = Im(Y) \qquad \text{eq. (12)}$$

and an inductance estimate as $$\hat{L} = -Re(Y)/\omega \qquad \text{eq. (13)}$$

An estimate of the characteristic impedance may be generated as $$Z_0 = \sqrt{-Y/\omega \cdot \hat{C}} \qquad \text{eq. (14)}$$

The correct solution is the root having positive real part and negative imaginary part.

Alternatively, a resistance estimate may be generated directly as $$\hat{R} = Im\left(\sqrt{\left(\frac{p}{2}\right)^2 - q}\right) \qquad \text{eq. (15)}$$

without generating Y. The root with a positive imaginary part is the correct solution, giving a positive value for $\hat{R}$.

An inductance estimate may alternatively be generated directly as $$\hat{L} = \pm Re\left(\sqrt{\left(\frac{p}{2}\right)^2 - q}\right) / \omega + \frac{p}{2\omega} \qquad \text{eq. (16)}$$

without generating Y. The root which gives a positive value for $\hat{L}$ is the correct solution.

By applying the rules of mathematics, numerous equivalent other formulas may be obtained which all embody the relationships disclosed above, explicitly or implicitly, and hence generate an estimate in dependence of $\hat{C}$, f and $\Gamma$.

Reduction of the Influence of Noise, Etc.

In order to improve accuracy, estimates of $Z_{in}$ at several different frequencies may be used. This is particularly convenient when $\hat{C}$ and $Z_{in}$ have been produced by the methods of WO2005SE01619 since $Z_{in}$ is then normally measured at a number of frequencies.

A simple approach is to make several estimates of a transmission line property based on values of $Z_{in}$ at different frequencies f, and then average the estimates.

An approach which may provide greater accuracy is to generate a set of intermediate values that correspond to the estimates of $Z_{in}$, and then to least squares fit a curve to the set of intermediate values and estimate a property of the transmission line in dependence of the coefficients of the fitted curve.

In particular, the real or imaginary part of $\Gamma^2$ may be the intermediate value. Several estimates of $Z_{in}$ for different frequencies f are made, and for each such estimate, $Im(\Gamma^2(\omega))$ and $Re(\Gamma^2(\omega))$ are generated.

A straight line $g(\omega) = a\omega$ is least squares fitted to the value pairs of $Im(\Gamma^2(\omega))$, $\omega$; and the line resistance estimate generated as $\hat{R} = a/\hat{C}$.

A quadratic function $h(\omega) = b\omega^2$ is least squares fitted to the value pairs of $Re(\Gamma^2(\omega))$, $\omega$; and the line inductance estimate generated as $\hat{L} = -b/\hat{C}$.

In general, after values of $\Gamma^2$ has been generated for a number of frequencies, this set of values may undergo noise reduction by replacing it with the function $\Gamma^2(\omega) = (b\omega^2 + ja\omega)$. Estimates of transmission properties are then made using the values of this function in the same way as they would have been made from values of $\Gamma^2$ that had not undergone noise reduction.

In situations when additive frequency-dependent noise is present, which is normally the case, the weighted least squares method is preferably used to improve the accuracy of parameter estimation. Preferably weights are chosen that are inversely proportional to the noise variance at the particular frequency.

Modification of the Method of WO2005SE01619

If used with the method of WO2005SE01619, $Z_{in}$ and $\hat{C}$ are preferably estimated as described in that patent application, while $\hat{R}$, $\hat{L}$ and $Z_0$ may be estimated with the method of the present invention, making use of the estimate of $\hat{C}$ and the estimate of $Z_{in}$ at a number of frequencies made with the method of WO2005SE01619. The calculations for the estimates of $\hat{R}$, $\hat{L}$ and $Z_0$ are preferably made with the same equipment as is used for the estimates of $Z_{in}$ and $\hat{C}$ according to WO2005SE01619.

DETAILED DESCRIPTIONS OF THE FIGURES

FIG. 1.

In the step 101, an estimate of the capacitance of the transmission line, $\hat{C}$, is generated. The estimated capacitance is the total capacitance of the transmission line. The methods described in patent application WO2005SE01619 or other methods known in the art may be used to generate the estimate.

In the step 200, one or more estimates of the complex open-ended impedance, $Z_{in}$, of the transmission line are generated. If more than one estimate are made, these may be made at different frequencies. For example, in WO2005SE01619 and the patent applications that it refers to, it is described a method to make an estimate of $Z_{in}$ at a number of frequencies. Other methods known in the art may of course be used.

In the step 300, an estimate of a transmission property of the transmission line is generated in dependence of $\hat{C}$, the frequency f and a value $\Gamma$, where $\Gamma$ satisfies the relationship $\Gamma \coth(\Gamma) = Z_{in} \cdot j\omega \hat{C}$, and $\omega = 2\pi f$.

The step 300 may be carried out in different ways. Examples of how the step 300 may be carried out are given in the FIGS. 2-12 and 16, and in the associated descriptions below.

FIG. 2. Numerical generation of $\Gamma$, estimate of $Z_0$.

In the step 301, $\Gamma$ is generated by numerical solution of $\Gamma \coth(\Gamma) = Z_{in} \cdot j\omega \hat{C}$.

In the step 305, an estimate of $Z_0$ is generated from $\Gamma$, $\omega$ and $\hat{C}$ by applying eq. (8).

FIG. 3. Calculation of $\Gamma^2$, estimate of $Z_0$.

In the step 302, $\Gamma^2$ is generated from $Z_{in}$, $\hat{C}$ and $\omega$ by applying eq. (4).

In the step 304, $\Gamma$ is generated by taking the square root of $\Gamma^2$. The correct root is the one with a positive real part and a positive imaginary part.

In the step 305, an estimate of $Z_0$ is generated from $\Gamma$, $\omega$ and $\hat{C}$ by applying eq. (8).

Figure 4:
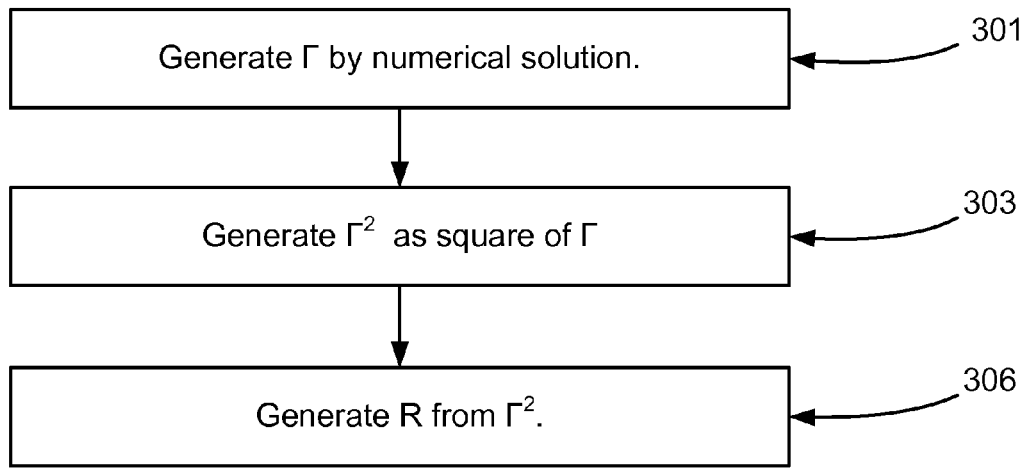

FIG. 4. Numerical generation of $\Gamma$, estimate of $\hat{R}$.

In the step 301, $\Gamma$ is generated by numerical solution of $\Gamma$ $\coth(\Gamma) = Z_{in} \cdot j\omega \hat{C}$.

In the step 303, $\Gamma^2$ is generated by squaring $\Gamma$.

In the step 306, an estimate of $\hat{R}$ is generated from $\omega$, $\hat{C}$ and $\Gamma^2$ by applying eq. (7).

Figure 5:
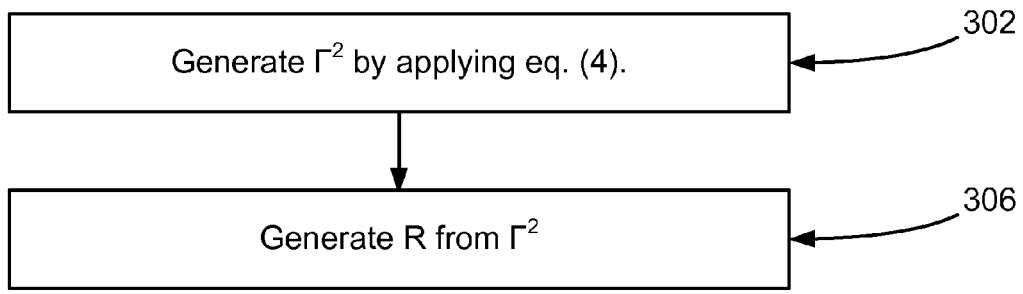

FIG. 5. Calculation of $\Gamma^2$, estimate of $\hat{R}$.

In the step 302, $\Gamma^2$ is generated from $Z_{in}$, $\hat{C}$ and $\omega$ by applying eq. (4).

In the step 306, an estimate of $\hat{R}$ is generated from $\omega$, $\hat{C}$ and $\Gamma^2$ by applying eq. (7).

Figure 6:
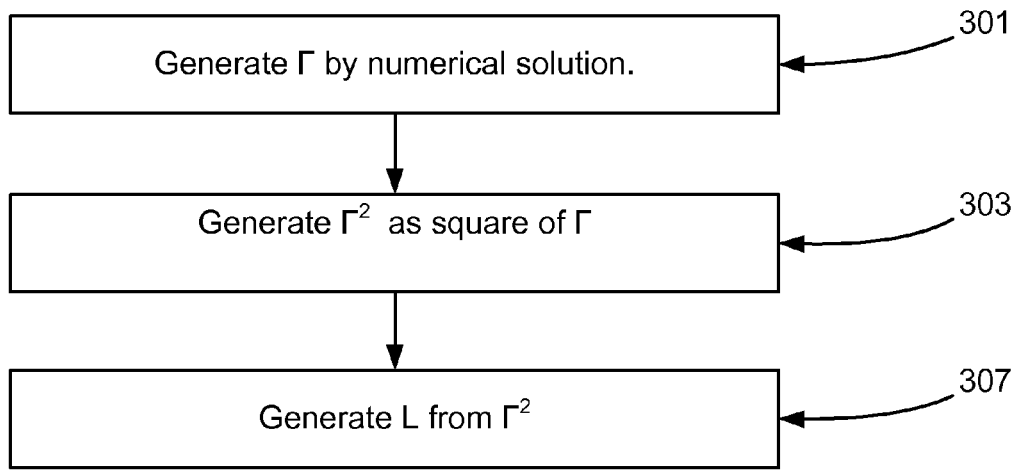

FIG. 6. Numerical generation of $\Gamma$, estimate of $\hat{L}$.

In the step 301, $\Gamma$ is generated by numerical solution of $\Gamma$ $\coth(\Gamma) = Z_{in} \cdot j\omega \hat{C}$.

In the step 303, $\Gamma^2$ is generated by squaring $\Gamma$.

In the step 307, an estimate of $\hat{L}$ is generated from $\omega$, $\hat{C}$ and $\Gamma^2$ by applying eq. (6).

Figure 7:
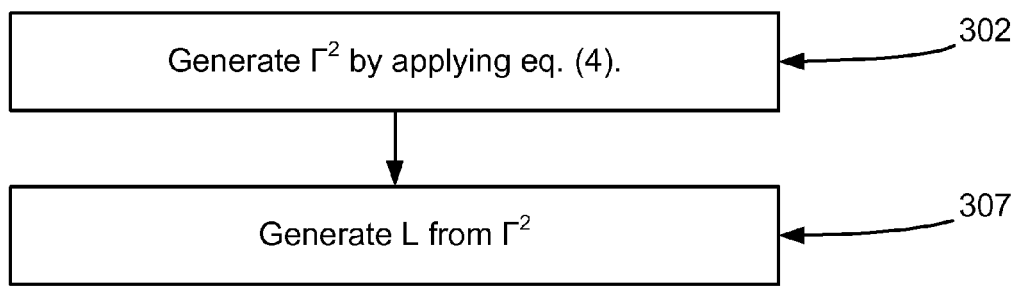

FIG. 7. Calculation of $\Gamma^2$, estimate of $\hat{L}$.

In the step 302, $\Gamma^2$ is generated from $Z_{in}$, $\hat{C}$ and $\omega$ by applying eq. (4).

In the step 307, an estimate of $\hat{L}$ is generated from $\omega$, $\hat{C}$ and $\Gamma^2$ by applying eq. (6).

In the FIGS. 8-12, eq. (4) is applied implicitly, without generating $\Gamma^2$. The results are in dependence of the value $\Gamma$, even though $\Gamma$ or $\Gamma^2$ are not explicitly generated.

Figure 8:
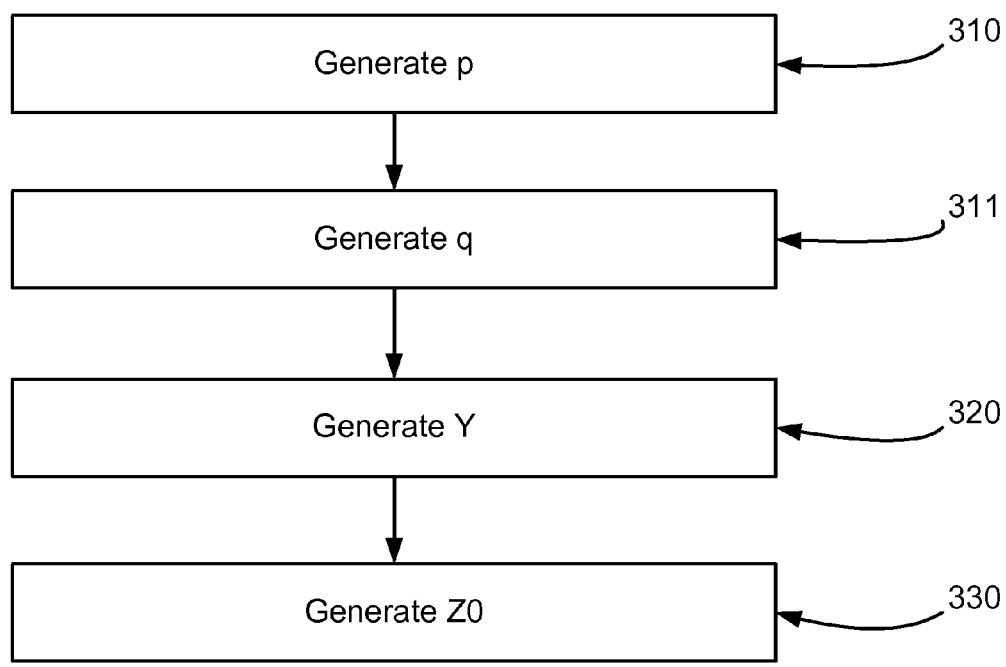

FIG. 8. Calculation of Y, estimate of $Z_0$.

In the step 310, p is generated from $\omega$ and $\hat{C}$ by applying eq. (9)

In the step 311, q is generated from $\omega$, $\hat{C}$ and $Z_{in}$ by applying eq. (10)

In the step 320, Y is generated from p and q by applying eq. (11). As evident from eq. (9a), Y is equal to $\Gamma^2$ multiplied by a predetermined value.

In the step 330, an estimate of $Z_0$ is generated from Y, $\omega$ and $\hat{C}$ by applying eq. (14).

Figure 9:
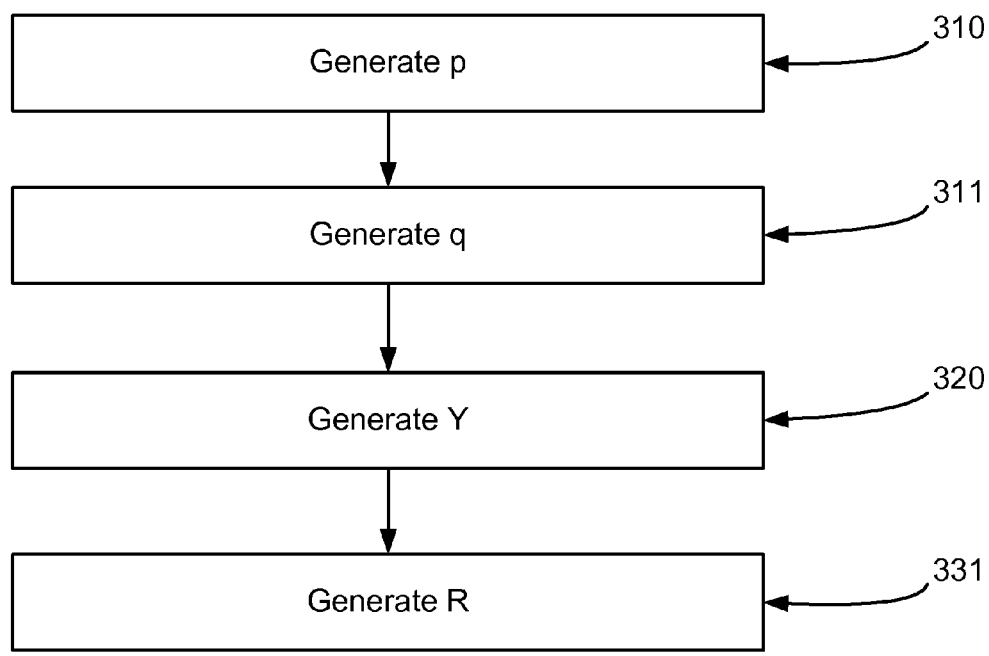

FIG. 9. Calculation of Y, estimate of $\hat{R}$.

In the step 310, p is generated from $\omega$ and $\hat{C}$ by applying eq. (9)

In the step 311, q is generated from $\omega$, $\hat{C}$ and $Z_{in}$ by applying eq. (10)

In the step 320, Y is generated from p and q by applying eq. (11). As evident from eq. (9a), Y is equal to $\Gamma^2$ multiplied by a predetermined value.

In the step 331, an estimate of $\hat{R}$ is generated as the imaginary part of Y by applying eq. (12). As evident from eq. (12), the imaginary part of $\Gamma^2$ multiplied by a predetermined value is used for the estimate.

Figure 10:
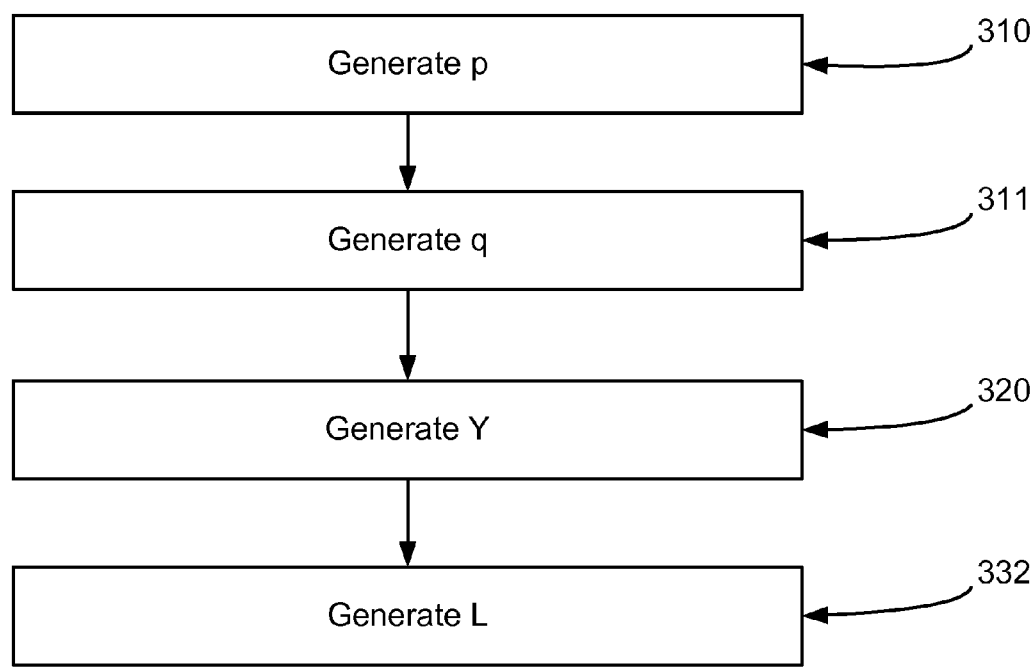

FIG. 10. Calculation of Y, estimate of $\hat{L}$.

In the step 310, p is generated from $\omega$ and $\hat{C}$ by applying eq. (9)

In the step 311, q is generated from $\omega$, $\hat{C}$ and $Z_{in}$ by applying eq. (10)

In the step 320, Y is generated from p and q by applying eq. (11). As evident from eq. (9a), Y is equal to $\Gamma^2$ multiplied by a predetermined value.

In the step 332, an estimate of $\hat{L}$ is generated from $\omega$ and the real part of Y by applying eq. (13). Hence, the real part of $\Gamma^2$ multiplied by a predetermined value is used for the estimate.

Figure 11:
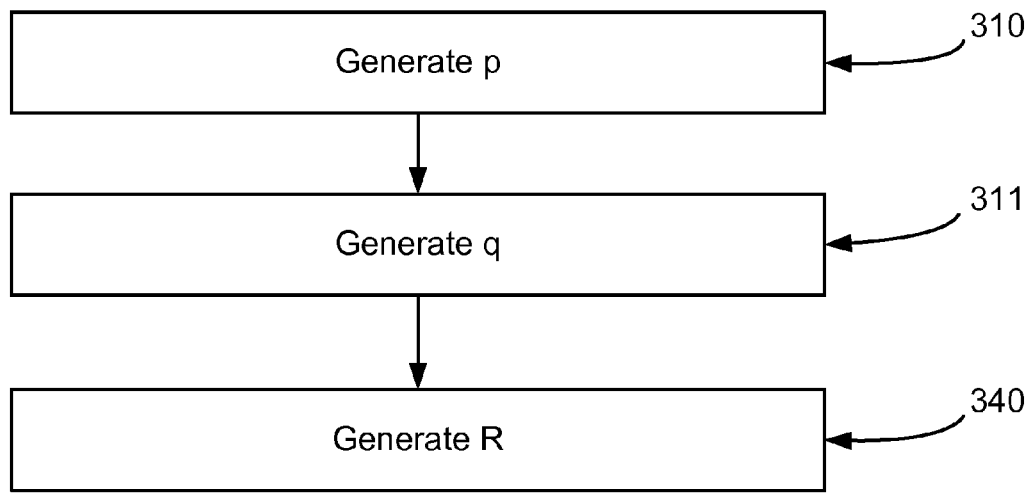

FIG. 11. Direct estimate of $\hat{R}$.

In the step 310, p is generated from $\omega$ and $\hat{C}$ by applying eq. (9)

In the step 311, q is generated from $\omega$, $\hat{C}$ and $Z_{in}$ by applying eq. (10)

In the step 340, an estimate of $\hat{R}$ is generated from p and q by applying eq. (15).

Figure 12:
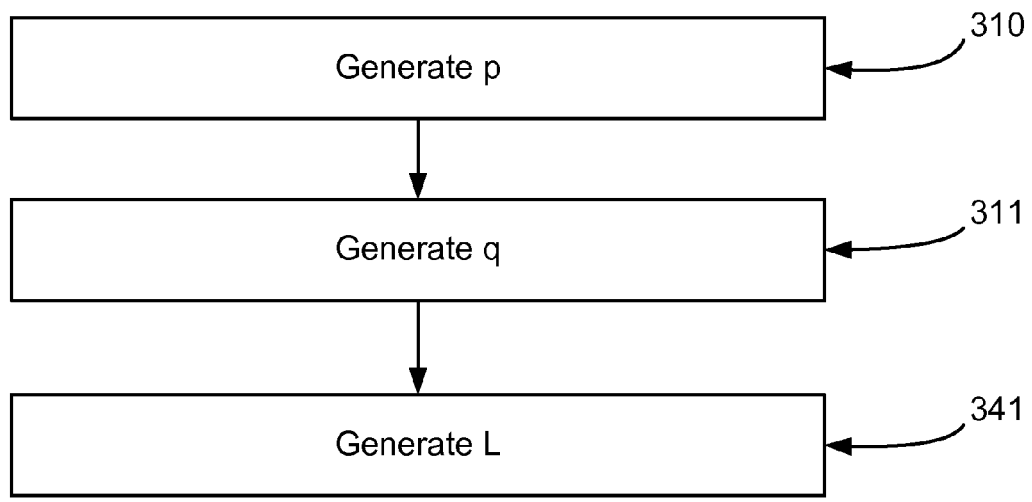
Figure 13:
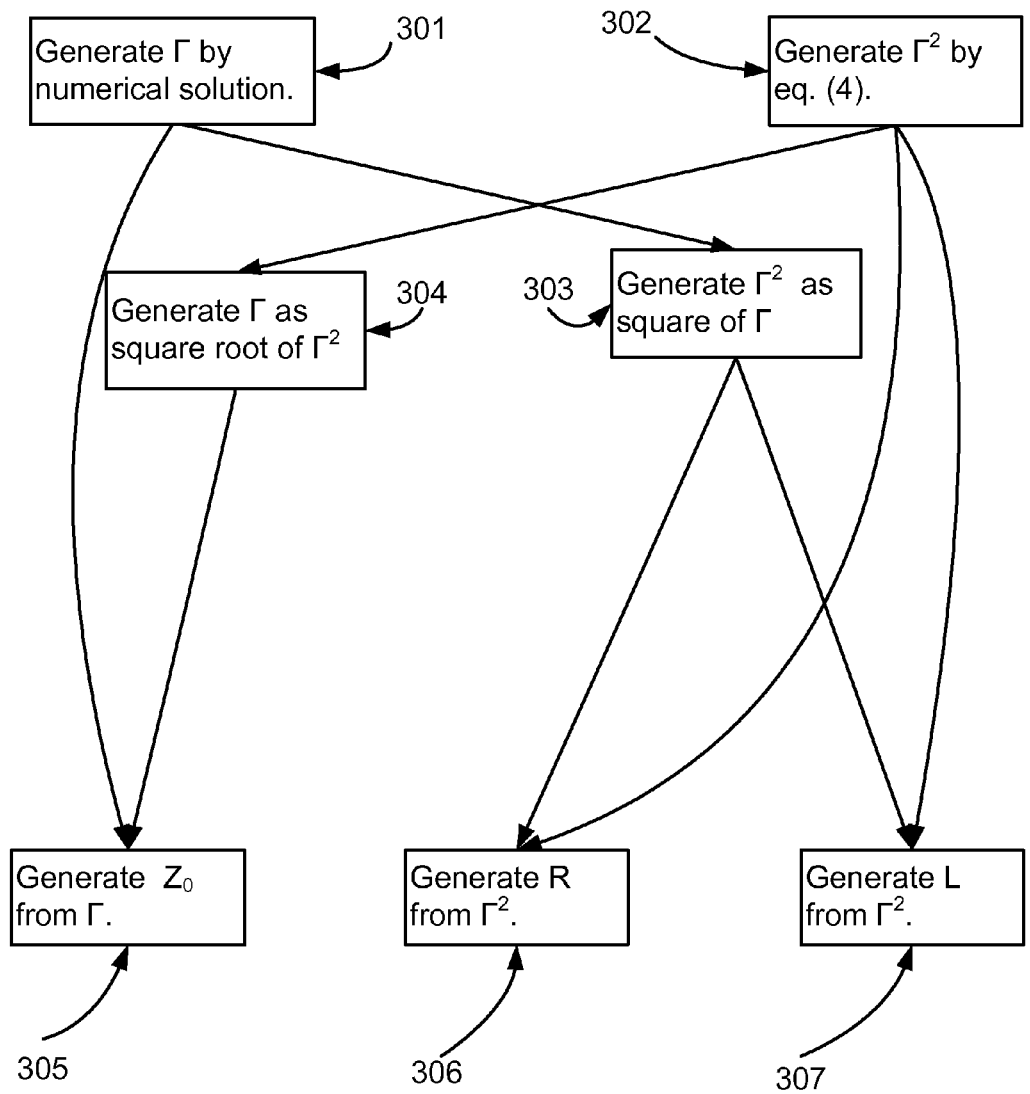
FIG. 13 shows a diagram of an overview of the flowcharts of the FIGS. 2-7.

FIG. 12. Direct estimate of $\hat{L}$.

In the step 310, p is generated from $\omega$ and $\hat{C}$ by applying eq. (9)

In the step 311, q is generated from $\omega$, $\hat{C}$ and $Z_{in}$ by applying eq. (10)

In the step 341, an estimate of $\hat{L}$ is generated from $\omega$, p and q by applying eq. (16).

FIG. 13.

This figure is an overview of the FIGS. 2-7.

The figure shows e.g. that $\Gamma$ is generated by numerical solution in step 301. In step 302 instead $\Gamma^2$ is generated by applying eq. (4). In step 303, $\Gamma^2$ is generated by squaring $\Gamma$, whereas in step 304, $\Gamma$ is generated by taking the square root of $\Gamma^2$. The correct root is the one having positive real part and positive imaginary part. In step 305, $Z_0$ is generated from $\Gamma$, in step 306 $\hat{R}$ is generated from $\Gamma^2$ and in step 307 $\hat{L}$ is generated from $\Gamma^2$.

Hence, an estimate of $Z_0$ may be made by executing the sequence of steps 301+305 (corresponding to FIG. 2) or the sequence 302+304+305 (corresponding to FIG. 3). An estimate of $\hat{R}$ may be made by executing the sequence of steps 301+303+306 (corresponding to FIG. 4) or the sequence 302+306 (corresponding to FIG. 5). An estimate of $\hat{L}$ may be made by executing the sequence of steps 301+303+307 (corresponding to FIG. 6) or the sequence 302+307 (corresponding to FIG. 7)

As is clear from the figure, when more than one transmission property is to be estimated, all steps need not be repeated. For example, estimates of $\hat{R}$, $\hat{L}$ and $Z_0$ may be generated by executing once the step 302 and storing the value of $\Gamma^2$, then executing the steps 304 and 305 for an estimate of $Z_0$, the step 306 for $\hat{R}$ and the step 307 for $\hat{L}$, using the stored value of $\Gamma^2$. Alternatively, the step 301 may be executed once and the value for $\Gamma$ stored, then the step 305 executed for an estimate of $Z_0$ and the step 303 to generate $\Gamma^2$, which is also stored. The step 306 is then executed for $\hat{R}$ and step 307 for $\hat{L}$, using the stored value for $\Gamma^2$.

FIG. 14. Example of physical setting

As already mentioned, telecommunication transmission lines typically terminate in one end at a customer premises site 61 and in the other end at a central office setting 130. Here, the lines are typically connected to line boards 100. The line boards 100 are typically controlled by a processor 110 of a telecommunication exchange. It is of great interest to be able to measure properties of the lines 60 from the central office setting 130.

Hence, this is a setting in which the methods according to the present invention may advantageously be used. The generation of estimates of $\hat{C}$ and $Z_{in}$ may, for example, be made by use of the methods disclosed in WO2005SE01619.

The calculations to generate estimates according to the present invention may be carried out in the processor 110, or in a separate computer such as a workstation 120. The results may for example be presented on screen, sent over a network, stored or printed.

FIG. 15.

This figure shows a diagram of frequency as a function of cable length for the condition that the absolute value of the propagation constant times line length equals $\pi$, for various ETSI cable types. The condition is valid below and to the left of each curve.

Figure 16:
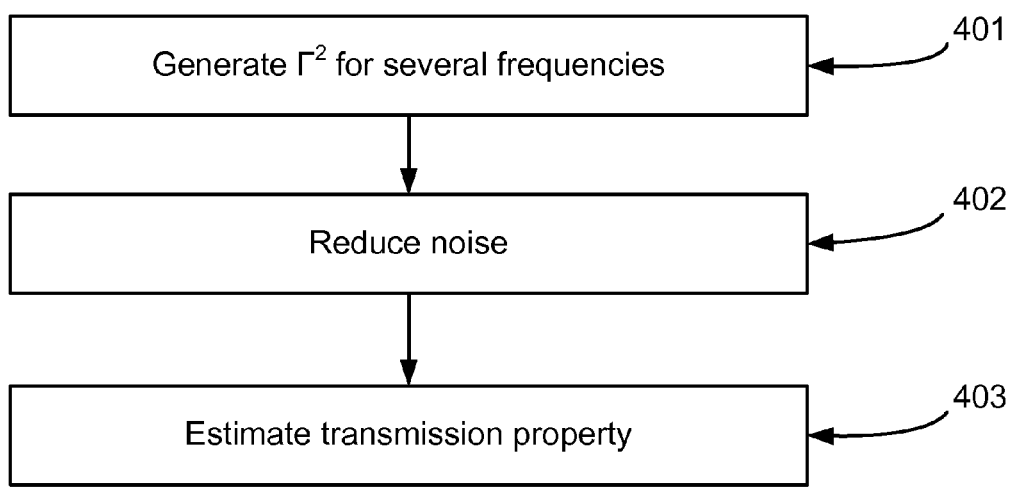
FIG. 16 shows a flowchart of a method for increasing the accuracy of estimates when several estimates of $Z_{in}$ at different frequencies f have been made. This is an example of how the last step of the flowchart of FIG. 1 may be carried out.

FIG. 16. Noise reduction of $\Gamma^2$ when several estimates of $Z_{in}$ have been made, estimation of transmission property.

In the step 401, values of $\Gamma^2$ are generated for each of a number of estimates of Zin which were made at different frequencies f.

The generation of $\Gamma^2$ may for example be done for each frequency by numerical solution of $\Gamma \coth(\Gamma)=Z_{in}\cdot j\omega\hat{C}$ and then squaring $\Gamma$ to obtain $\Gamma^2$, or by applying eq. (4).

In the step 402, a quadratic function $h(\omega)=b\omega^2$ is least squares fitted to the value pairs of $Re(\Gamma^2(\omega))$, $\omega$; and a straight line $g(\omega)=a\omega$ is least squares fitted to the value pairs of $Im(\Gamma^2(\omega))$, $\omega$.

In the step 403, a transmission property is estimated, using for $\Gamma^2$ the function $\Gamma^2(\omega)=(b\omega^2+ja\omega)$.

If R or L is to be estimated, an arbitrary $\omega$ is chosen, $\Gamma^2(\omega)$ is calculated and eq. (7) or eq. (6) is applied.

If $Z_0$ is to be estimated, the frequency f for which an estimate is desired is determined, $\Gamma^2(\omega)$ is calculated for the corresponding angular frequency $\omega$, $\Gamma$ is generated as the square root of $\Gamma^2(\omega)$), and eq. (8) is then applied. The correct root is the one which generates $\Gamma$ with positive real part and positive imaginary part.

Of course, even if several transmission properties are to be estimated, steps 401 and 402 need only be executed once.

Results

Early results indicate that the methods according to the present invention achieve estimates of $\hat{R}$ and $\hat{L}$ that may be 100 times more accurate than those of WO2005SE01619, provided that the effects of noise are suitably handled.

The invention claimed is:

1. A method for determining an estimate of at least one transmission property of a telecommunication transmission line, the method comprising the steps of:
   generating an estimate of a complex impedance $Z_{in}$ of the transmission line at a frequency $f$;
   generating an estimate of a capacitance, $\hat{C}$, of the transmission line; and
   generating an estimate of the at least one transmission property of the line in dependence of $\hat{C}$, the frequency $f$ and a value $\Gamma$, where $\Gamma$ satisfies the relationship $\Gamma \coth(\Gamma)=Z_{in}\cdot j\omega\hat{C}$, and $\omega=2\pi f$;
   wherein a value X is generated from the relationship $\Gamma \coth(\Gamma)=Z_{in}\cdot j\omega\hat{C}$, where X is $\Gamma$, $\Gamma^2$ $\Gamma^2/\omega\hat{C}$ or one of them multiplied by a predetermined value, or the real, or imaginary part of any one of those, and where X is used to make the estimate of the at least one transmission property; and
   wherein X is an independent solution for the angular frequency $\omega$.

2. A method according to claim 1 wherein $\Gamma^2$ is generated as $$\frac{-\frac{1}{3}\pm\sqrt{\left(\frac{1}{3}\right)^2-4\cdot\left(-\frac{1}{45}\right)\cdot(1-Z_{in}\cdot j\omega\cdot\hat{C})}}{2\cdot\left(-\frac{1}{45}\right)}.$$

3. A method according to claim 1 wherein $\Gamma$ is generated by numerical solution of $\Gamma \coth(\Gamma)=Z_{in}\cdot j\omega\hat{C}$.

4. A method according to claim 3, wherein the numerical solution method is the van Wijngaarden-Dekker-Brent method.

5. A method according to claim 3, wherein the solution for $\Gamma$ is obtained by iterating according to any one of the functions $$\Gamma_{i+1}=\text{arc } tanh(\Gamma_i/\Gamma_{in}) \quad (1)$$

$$\Gamma_{i+1}=\text{arc } coth(\Gamma_{in}/\Gamma_i) \quad (2)$$

$$\Gamma_{i+1}=\frac{1}{2}\log\left(\frac{\Gamma_{in}+\Gamma_i}{\Gamma_{in}-\Gamma_i}\right) \quad (3)$$

where $\Gamma_{in}=Z_{in}\cdot j\omega\cdot\hat{C}$.

6. A method according to claim 1 wherein the estimated property is line inductance.

7. A method according to claim 6 wherein the inductance estimate is generated as $-Re(\Gamma^2)/\omega^2\hat{C}$.

8. A method according claim 1 wherein the estimated property is line resistance.

9. A method according to claim 8 wherein the line resistance estimate is generated as $Im(\Gamma^2)/\omega\hat{C}$.

10. A method according to claim 1 wherein the estimated property is line characteristic impedance.

11. A method according to claim 10 wherein the estimate of the characteristic impedance is generated as $$\frac{\Gamma}{j\omega\cdot\hat{C}}.$$

12. A method according to claim 1 wherein several estimates of the same property are made using estimates of $Z_{in}$ made at different frequencies.

13. A method according to claim 8, comprising the steps of generating further estimates of $Z_{in}$ for different frequencies $f$;
   for each frequency $f$, generating $Im(\Gamma^2(\omega))$;
   least squares fitting a straight line $g(\omega)=a\omega$ to the value pairs of $Im(\Gamma^2(\omega))$, $\omega$; and
   generating the line resistance estimate as $a/\hat{C}$.

14. A method according to claim 6 comprising the steps of generating further estimates of $Z_{in}$ for different frequencies $f$;
   for each frequency $f$, generating $Re(\Gamma^2(\omega))$;
   least squares fitting a quadratic function $h(\omega)=b\omega^2$ to the value pairs of $Re(\Gamma^2(\omega))$, $\omega$; and
   generating the line inductance estimate as $-b/\hat{C}$.

15. A method according to claim 1, comprising the steps of generating further estimates of $Z_{in}$ for different frequencies $f$;
   for each frequency $f$, generating $Re(\Gamma^2(\omega))$ and $Im(\Gamma^2(\omega))$;
   least squares fitting a straight line $g(\omega)=a\omega^2$ to the value pairs of $Im(\Gamma^2(\omega))$, $\omega$;
   least squares fitting a quadratic function $h(\omega)=b\omega^2$ to the value pairs of $Re(\Gamma^2(\omega))$, $\omega$; and
   making an estimate of a transmission property of the transmission line, using for $\Gamma^2$ the function $\Gamma^2(\omega)=(b\omega^2+ja\omega)$.

* * * * *

UNITED STATES PATENT AND TRADEMARK OFFICE
CERTIFICATE OF CORRECTION

PATENT NO. : 8,428,224 B2  
APPLICATION NO. : 12/988314  
DATED : April 23, 2013  
INVENTOR(S) : Fertner et al.

It is certified that error appears in the above-identified patent and that said Letters Patent is hereby corrected as shown below:

In the Specification

In Column 10, Line 41, delete "lines" and insert -- lines 60 --, therefor.

Signed and Sealed this
Eighth Day of July, 2014

Michelle K. Lee
*Deputy Director of the United States Patent and Trademark Office*